United States Patent [19]
Arai

[11] Patent Number: 5,305,032
[45] Date of Patent: Apr. 19, 1994

[54] SEALING MEMBER FOR WATERPROOF CAMERA

[75] Inventor: Akihiro Arai, Tokyo, Japan

[73] Assignee: Asahi Kogaku Kogyo Kabushiki Kaisha, Tokyo, Japan

[21] Appl. No.: 55,775

[22] Filed: May 3, 1993

Related U.S. Application Data

[63] Continuation of Ser. No. 785,924, Oct. 31, 1991, abandoned.

[30] Foreign Application Priority Data

Nov. 19, 1990 [JP] Japan ............... 2-120998[U]

[51] Int. Cl.$^5$ .............................................. G03B 17/08
[52] U.S. Cl. .................................................... 354/64
[58] Field of Search ........................ 354/64, 288, 266

[56] References Cited

U.S. PATENT DOCUMENTS

| | | | |
|---|---|---|---|
| 4,208,118 | 6/1980 | Urano et al. | 354/288 |
| 4,244,591 | 1/1981 | Umetsu | 277/212 F |
| 4,375,323 | 3/1983 | Inagaki et al. | 354/64 |
| 4,383,743 | 5/1983 | Nozawa et al. | 354/64 |
| 4,440,403 | 4/1984 | Urano et al. | 277/88 X |
| 4,803,504 | 2/1989 | Maeno et al. | 354/64 |

FOREIGN PATENT DOCUMENTS

| | | | |
|---|---|---|---|
| 3112875 | 4/1982 | Fed. Rep. of Germany | 354/64 |
| 61-231086 | 4/1988 | Japan | 354/64 |
| 61-246497 | 5/1988 | Japan | 354/64 |

Primary Examiner—Michael L. Gellner
Assistant Examiner—J. K. Han
Attorney, Agent, or Firm—Sandler Greenblum & Bernstein

[57] ABSTRACT

A waterproof device for a cover in which a camera body is housed, closing off an inside and an outside of the cover in a watertight manner. A first sealing member is disposed between a rear cover, included in the cover, and a front cover provided on one side of the rear cover. A second sealing member is disposed between the rear cover and a back lid provided on the other side of the rear cover. A connecting member is extended through a hold formed in the rear cover, to connect the first sealing member and the second sealing member. The connecting member, the first sealing member, and the second sealing member are formed as one body.

11 Claims, 4 Drawing Sheets

SEALING MEMBER FOR WATERPROOF CAMERA

This application is a continuation of application Ser. No. 07/785,924, filed Oct. 31, 1991, now abandoned.

BACKGROUND OF THE INVENTION

1. Field of the Invention

The present invention relates to a waterproof device for a camera, more particularly, to an improvement for a sealing structure of a camera cover in which a camera body is housed.

2. Description of the Related Art

Conventionally, a camera body is housed in a cover formed by a front cover and a rear cover, provided with an opening to load and unload film from the camera body, with the opening being opened and closed by a back lid. A sealing member is packed in a space between the front cover and the rear cover, and another sealing member is packed in a space between the back lid and the rear cover.

Thus, in a conventional camera, sealing members are provided in a portion between the front cover and the rear cover, and in a portion between the back lid and the rear cover, independently from each other. Accordingly, in an assembling process, two sealing members must be separately attached to the cover, which is cumbersome and hinders efforts to lower the cost of a camera.

SUMMARY OF THE INVENTION

Therefore, an object of the present invention is to provide a waterproof device for a camera in which the number of parts is reduced in comparison with a conventional device and the process of assembling the sealing member is simplified. Thus, the cost of the camera can be lowered.

According to the present invention, there is provided a waterproof device for a cover in which a camera body is housed, closing off an inside and an outside of the cover in a watertight manner. The cover includes a cover member and the device comprising a first sealing member, a second sealing member, and a connecting member. The first sealing member is disposed between the cover member and a first member provided on one side of the cover member. The second sealing member is disposed between the cover member and a second member provided on the other side of the cover member. The connecting member extends through a hole formed in the cover member to connect the first sealing member and the second sealing member. The connecting member, the first sealing member, and the second sealing member are formed as one body.

Further, according to the present invention, there is provided a waterproof device for a cover in which a camera body is housed, closing off an inside and an outside of the cover in a watertight manner. The cover has a first member, a second member, and a third member sandwiched between the first and second members. The device further comprises a first sealing member, a second sealing member, and at least one connecting member connecting the first sealing member and the second sealing member as one body. The first sealing member is disposed between the first and third members, with the second sealing member being disposed between the second and third members. The connecting member extends through holes formed in the third member.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
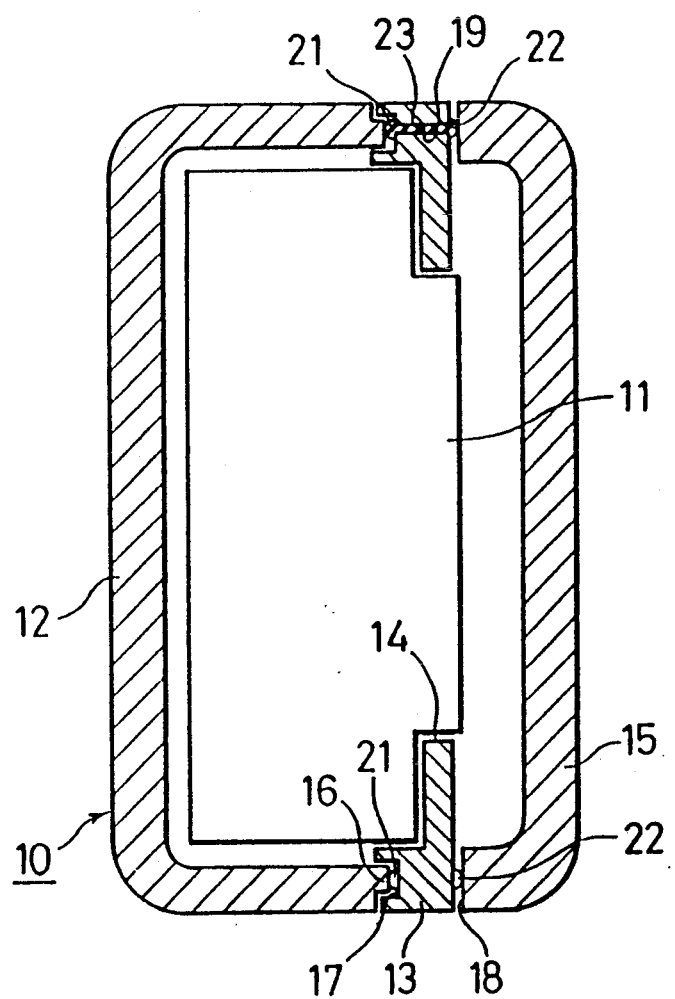
FIG. 1 is a sectional view showing a waterproof camera to which an embodiment according to the present invention is applied.

The present invention will now be described with reference to embodiments shown in the drawings.

FIG. 1 shows a waterproof camera to which an embodiment according to the present invention is applied. A camera body 11 of this waterproof camera is housed in a cover 10 composed of a first member or front cover 12 formed as a box-shape and a rear cover 13 formed as a frame-shape. An opening 14 is formed in the rear cover 13, to load film into the camera body 11 and unload the film from the camera body 11. A second member or back lid 15 is provided for opening and closing the opening 14. Namely, the front cover 12, the rear cover (third member) 13 and the back lid 15 are each part of the cover 10, respectively.

As described above, the front cover 12 is provided on one side of the rear cover 13, and the back lid 15 is provided on the other side of the rear cover 13. Namely, the rear cover 13 is sandwiched between the front cover 12 and the back lid 15.

A ridge portion 16 is formed on and along the whole periphery of an opening of the front cover 12. A seal groove 17 is formed on an outer periphery of the rear cover 13, to receive the ridge 16. A first seal member 21, extending along the whole seal groove 17, is disposed between the seal groove 17 and the ridge portion 16. A second seal member 22, extending along the whole outer periphery of the rear cover 13, is disposed between the rear cover 13 and the back lid 15. Holes 19 are formed in the rear cover 13, to extend from the one surface thereof to the other surface thereof. Connecting members 23 connect the first and second sealing members 21 and 22 that are extended through the holes 19. Namely, the first sealing member 21, the second sealing member 22 and the connecting member 23 are formed as one body, and a packing is constructed by these members 21, 22 and 23. Note, this packing is made of a silicon rubber, for example.

Figure 2:
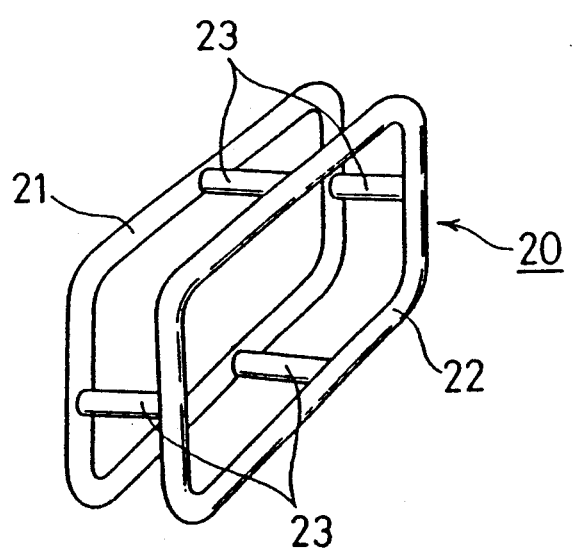
FIG. 2 is a perspective view showing an external appearance of a packing.

FIG. 2 shows an external appearance of the packing 20. The first and second sealing members 21 and 22 have a rectangular shape, respectively, corresponding to a shape of the outer periphery of the rear cover 13. Each of the connecting members 23 connects a portion corresponding to a side of the rectangle of the first sealing member 21 to a portion corresponding to a side of the rectangle of the second sealing member 22. Note, the number of connecting members 23, and the positions at which the connecting members 23 are provided, are not restricted to the embodiment shown in the drawings, but can be set to any number or positions considered appropriate.

Figure 3:
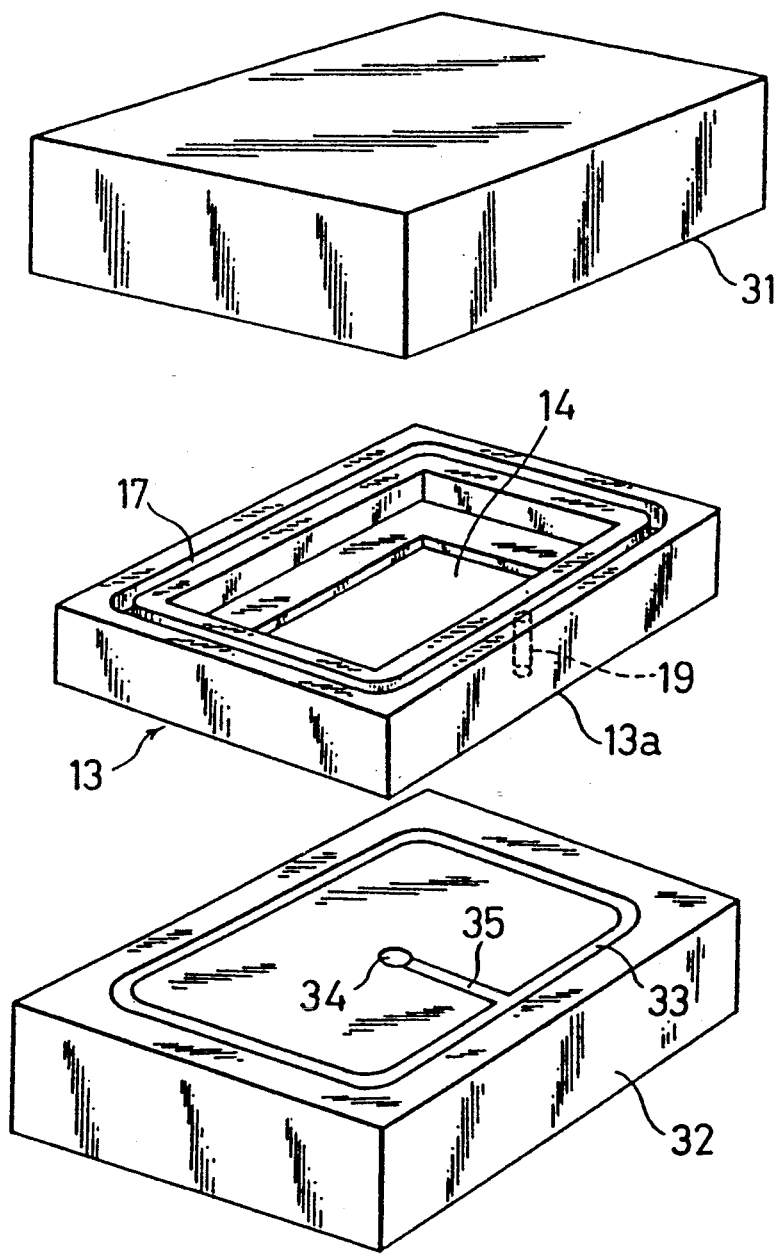
FIG. 3 is a disassembled perspective view showing a process in which a packing is assembled to a rear cover.

FIG. 3 shows a process in which the packing described above is assembled into the rear cover 13. A forming device used in this assembling process is composed of an upper mold 31 and a lower mold 32. The lower mold 32 is mounted to a fixed frame, not shown, and the upper mold 31 is connected to a drive mechanism, not shown, to be moved upward and downward. The rear cover 13 is disposed on the lower mold 32, and the upper mold 31 is located on the rear cover 13 and the lower mold 32, and then a forming of the packing is carried out. Note, although only one hole 19 is shown in FIG. 3, the number (four in FIG. 2) of holes 19 coincides with the number of connecting members 23.

Figure 4:
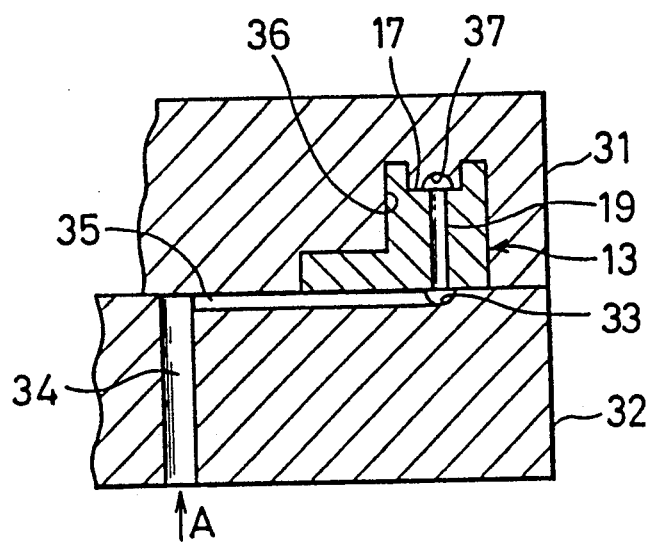
FIG. 4 is a sectional view showing the process in which the packing is assembled to the rear cover by an upper mold and a lower mold.

The lower mold 32 is provided with an endless molding groove 33 formed on a portion facing an outer periphery of an under surface 13a of the rear cover 13 and extended along the line corresponding to the sealing groove 17. A lead hole 34 is formed in the center of the rear cover 13, and the molding groove 33 and the lead hole 34 are connected to each other by a connecting groove 35 formed on an upper surface of the lower mold 32. As shown in FIG. 4, the upper mold 31 is provided with a receiving chamber 36 in which a rear cover 13 is fitted. A molding groove 37 is formed on a surface which is a part of a wall defining the receiving chamber 36, and faces the sealing groove 17 of the rear cover 13. The molding groove 37 is extended along the sealing groove 17, similar to the molding groove 33 of the lower mold 32.

In a process of forming the packing, the rear cover 13 is sandwiched between the lower mold 32 and the upper mold 31, as shown in FIG. 4. In this condition, melted silicon rubber is supplied from a source (not shown) to a space between the lower mold 32 and the upper mold 31, under pressure. Namely, this silicon rubber passes through the lead hole 34, as shown by an arrow A, and flows from a side of an under surface of the lower mold 32 to a side of an upper surface thereof. Then, the silicon rubber is supplied to the molding groove 33 of the lower mold 32 through the connecting groove 35, and supplied to the molding groove 37 of the upper mold 31 through the hole 19, whereby, the silicon rubber is supplied to and fills the whole of the molding grooves 33 and 37, and the hole 19. This silicon rubber is then solidified by cooling, and thereafter, the rear cover 13 is released from the upper mold 31 and the lower mold 32. The rubber portion corresponding to the connecting groove 35 is cut off, whereby the process of forming the packing is completed.

As described above, in this embodiment, separate sealing members are not provided between the front cover 13 and the other members, respectively, since the first sealing member 21 and the second sealing member 22 are connected to each other through the connecting member 23, extended through the hole 19, passing through the front cover 13, and thus are formed as one body. Therefore, the packing composed of these sealing members 21 and 22 and the connecting member 23 is assembled into the front cover 13 by a forming process as described above, and a cumbersome forming process in which separate sealing members are attached to the front cover as in a conventional process is not required. Namely, according to this embodiment, the number of parts of the cover of the waterproof camera is reduced, and thus the process of assembling the waterproof camera is simplified.

Further, in this embodiment, since the sealing members 21 and 22 are connected to the front cover 13 as one body, these sealing members 21 and 22 will not be detached from the rear cover 13 during the assembling process, and therefore, the handling of the rear cover 13 and the sealing members 21 and 22 is made easier, and the assembling process of the camera is facilitated.

In the embodiment described above, the packing is provided on the both sides of the rear cover 13. The present invention, however, is not restricted to such a construction, but can be applied to purposes. For example, the second sealing member 22 can be provided between a battery cover and the rear cover 13.

Figure 5:
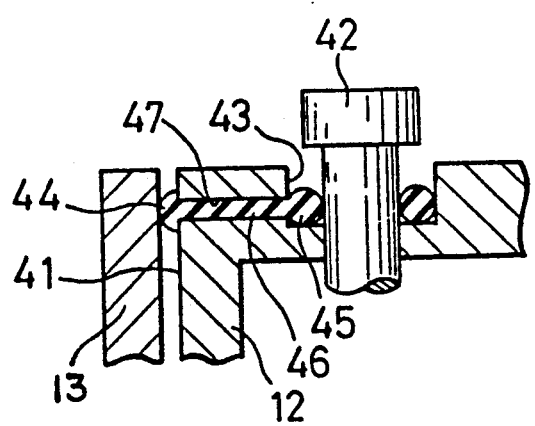
FIG. 5 is a sectional view showing another embodiment according to the present invention.

Further, the sealing members need not be provided on outer and inner surfaces of the cover, but may be provided between a side wall surface 41 formed on an outer surface of the front cover 12 and an cylindrical surface 43 formed on a shutter button 42, as in an embodiment shown in FIG. 5. In this embodiment, the first sealing member 44 is extended along the whole length of an outer periphery of the front cover 12, and is the same as the sealing member 21 shown in FIG. 2. The second sealing member 45, however, is an O-ring fitted on an outer surface of the shutter button 42. A connecting member 46 is extended through a hole 47 connecting the side wall surface 41 and the cylindrical surface 43.

Although the embodiments of the present invention have been described herein with reference to the accompanying drawings, obviously many modifications and changes may be made by those skilled in this art without departing from the scope of the invention.

I claim:

1. A waterproof device for a cover having an opening in which a camera body is housed, closing off an inside and an outside of said cover in a watertight manner, said cover including a cover member, said cover member including first and second opposed surfaces and at least one through hole being separate from said opening and extending within and through said cover member from said first surface to said second surface, and said waterproof device comprising:

a first sealing member disposed between said cover member and a first member provided at said first surface of said cover member;

a second sealing member disposed between said cover member and a second member provided at said second surface of said cover member, said cover member, said first member, and said second member forming said opening; and a third sealing member extending through said at least one through hole formed in said cover member and connecting said first sealing member and said second sealing member, with said third sealing member, said first sealing member and said second sealing member being formed as one body.

2. A waterproof device according to claim 1, wherein said first member is a front cover forming a part of said cover, said cover member is a rear cover forming a part of said cover, and said second member is a back lid opening and closing an opening formed in said rear cover to allow loading and unloading of film.

3. A waterproof device according to claim 2, wherein said first sealing member and said second sealing member are extended along a periphery of said first surface and said second surface of said cover member, respectively.

4. A waterproof device according to claim 3, wherein said third sealing member comprises a plurality of sealing members being spaced along and connecting said first and second sealing members.

5. A waterproof device according to claim 1, wherein said second member is a shutter button, and said cover member is a front cover forming a part of said cover.

6. A waterproof device according to claim 5, wherein said second sealing member is an O-ring fitted to said shutter button.

7. A waterproof device according to claim 1, wherein said third sealing member is substantially linear.

8. A waterproof device according to claim 1, wherein said cover member surrounds said through hole.

9. A waterproof device for a cover having an opening in which a camera body is housed, closing off an inside and an outside of said cover in a watertight manner, said cover having a first member, a second member, and a third member sandwiched between said first and second members, said first member, said second member, and said third member forming said opening, said third member including first and second opposed surfaces and at least one through hole being separate from said opening and extending within and through said third member from said first surface to said second surface, said device comprising:
- a first sealing member disposed between said first and third members;
- a second sealing member disposed between said second and third members; and
- at least one third sealing member connecting said first sealing member and said second sealing member as one body, said third sealing member extending through a respective through hole formed in said third member.

10. A waterproof device according to claim 9, wherein said third sealing member is substantially linear.

11. A waterproof device according to claim 9, wherein said third member surrounds said through hole.

* * * * *